United States Patent
Park et al.

[11] Patent Number: 5,844,715
[45] Date of Patent: Dec. 1, 1998

[54] PROJECTION SCREEN FOR REAR PROJECTION TELEVISION SET

[75] Inventors: Jong-bae Park, Suwon; Chang-wan Hong, Anyang, both of Rep. of Korea

[73] Assignee: Samsung Electronics Co., Ltd., Kyungki-Do, Rep. of Korea

[21] Appl. No.: 686,404

[22] Filed: Jul. 25, 1996

[30] Foreign Application Priority Data

Jul. 31, 1995 [KR] Rep. of Korea ............ 95-23463

[51] Int. Cl.$^6$ .................................................. G02R 27/00
[52] U.S. Cl. ............................................. 389/457; 359/455
[58] Field of Search ........................ 389/1.5, 443, 452, 389/453, 455–457, 460, 463, 599, 620

[56] References Cited

U.S. PATENT DOCUMENTS 4,056,395 11/1977 Sato et al. ............................ 96/36
5,276,538 1/1994 Monji et al. ........................ 359/40
5,513,037 4/1996 Yoshida et al. .................... 359/457

FOREIGN PATENT DOCUMENTS 56-62238  5/1981  Japan .
222637    1/1990  Japan .
112236    2/1991  Japan .

*Primary Examiner*—Daniel P. Malley
*Attorney, Agent, or Firm*—Sughrue, Mion, Zinn, Macpeak & Seas, PLLC

[57] ABSTRACT

A projection screen for a rear projection television set includes a Fresnel lens for focusing incident image light so as to center on an optical axis of the projection screen, and an optical diffusion member including a lenticular lens portion for diffusing the image light received from the Fresnel lens, wherein the external surface of the optical diffusion member is made of glass. The projection screen provides a wider angle of view compared with the Fresnel lens made of acryl and is resistant to scratching or breakage.

6 Claims, 3 Drawing Sheets

PROJECTION SCREEN FOR REAR PROJECTION TELEVISION SET

BACKGROUND OF THE INVENTION

The present invention relates to a projection screen for a rear projection television set and, more particularly, to a projection screen for a rear projection television set, in which a screen for displaying thereon image light projected from a projector including a cathode ray tube and a projection lens is designed to have a wide angle of view and a sense of a direct view as in a Brown tube.

A screen for a rear projection television set is constituted by a Fresnel lens and a lenticular lens. A reference numeral 10 in FIG. 1 designates a screen. A Fresnel lens designated by a reference numeral 11 is located on the side of a Brown tube, and focuses a beam of light passing via peripheral portions spaced from the center of the screen 10 toward the center of the screen 10. A lenticular lens designated by a reference numeral 12 widens a characteristic of the horizontal direction of the screen 10 so that brightness of the screen 10 becomes uniform over the whole surface of the screen 10 (see FIG. 2).

The Fresnel lens and the lenticular lens in the existing rear projection television set are made of acryl. Accordingly, a screen has a big difference in an angle of view according to a viewing angle to thereby narrow an overall angle of view. Also, the material is easily apt to be scratched and be broken due to weakness in strength, to thereby deteriorate a quality of the picture.

SUMMARY OF THE INVENTION

To solve the above problem, it is an object of the present invention to provide a projection screen for a rear projection television set in which the surface of a screen for displaying an optical image is made of glass.

To accomplish the above object of the present invention, there is provided a projection screen for a rear projection television set comprising:

a Fresnel lens for focusing incident image light so as to center on an optical axis of the projection screen; and
an optical diffusion member including a lenticular lens portion for diffusing the image light received from the Fresnel lens, wherein the external surface of the optical diffusion member is made of glass.

BRIEF DESCRIPTION OF THE DRAWINGS

The preferred embodiments are described with reference to the accompanying drawings, wherein.

DETAILED DESCRIPTION OF THE PREFERRED EMBODIMENTS

Preferred embodiments of the present invention will be described below in more detail with reference to the accompanying drawings.

Figure 1:
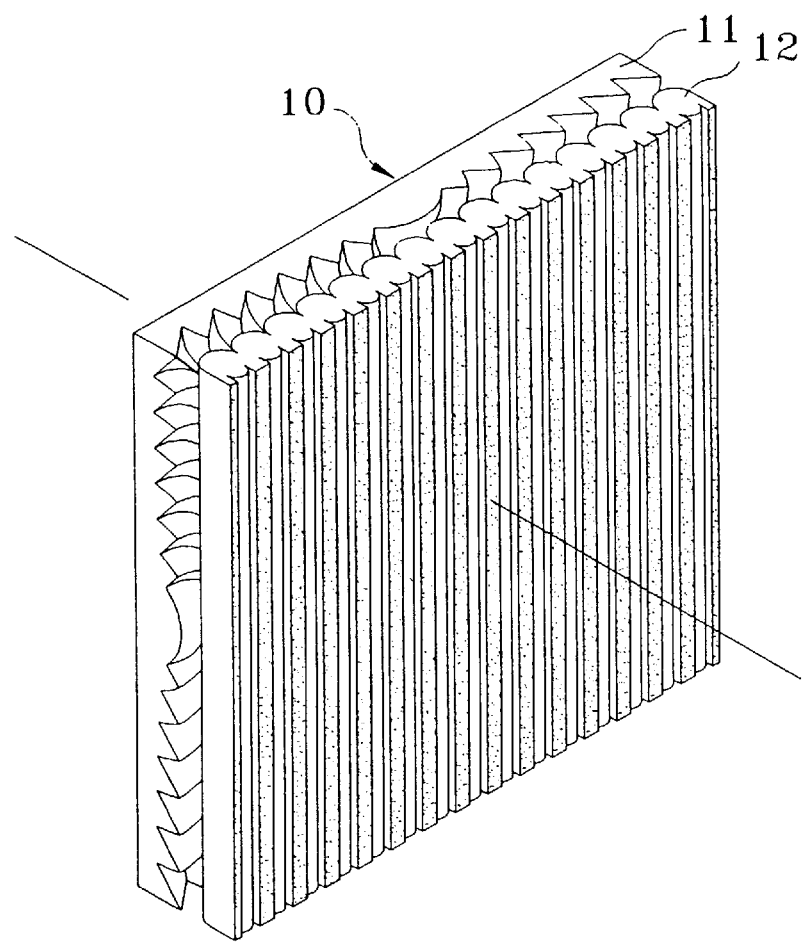
FIG. 1 is a perspective view of the structure of a screen in a general rear projection television set.
Figure 2:
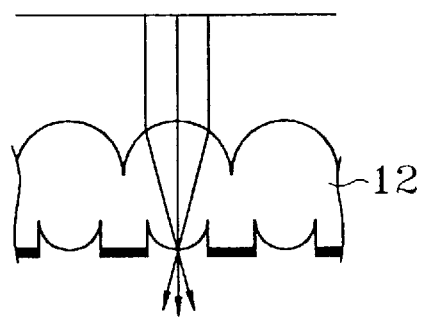
FIG. 2 is a view for explaining the function of a lenticular lens of FIG. 1.
Figure 3A:
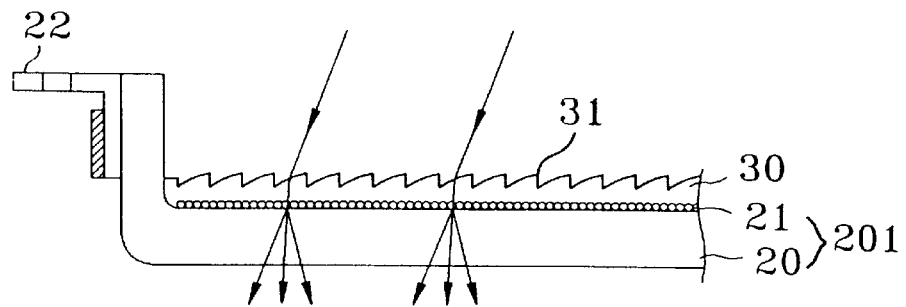
FIG. 3A is a side elevational view showing a projection screen for a rear projection television set according to an embodiment of the present invention.
Figure 3B:
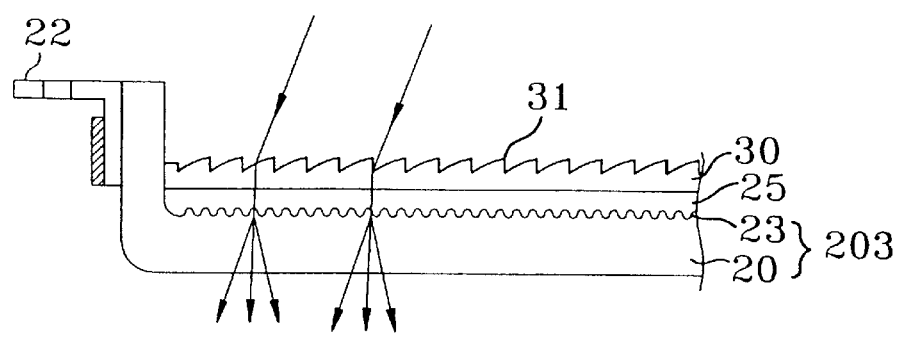
FIG. 3B is a side elevational view showing a projection screen for a rear projection television set according to another embodiment of the present invention.
Figure 3C:
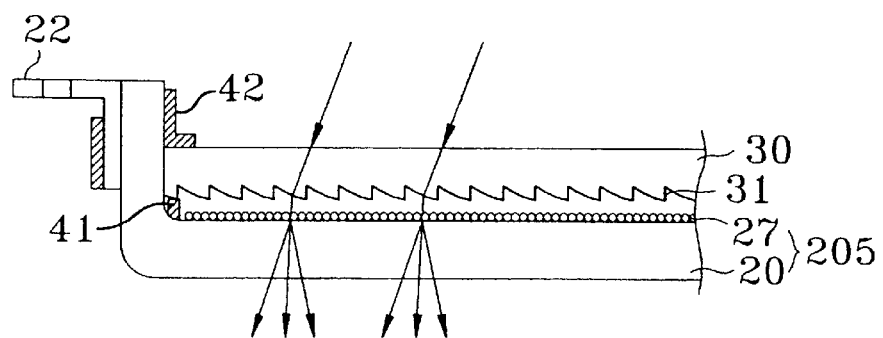
FIG. 3C is a side elevational view showing a projection screen for a rear projection television set according to still another embodiment of the present invention.

FIGS. 3A–3C show the projection screens for a rear projection television set according to the present invention, and are side elevational views showing the embodiments of the projection screens, called "glascreens". In the projection screen shown in FIG. 3A, a Fresnel lens 30 is constituted by an ultraviolet thermosetting resin or a transparent sheet having a Fresnel characteristic, and has circular pitches 31 directed toward the inner side of the projection television set. An optical diffusion member 201 includes an outer reinforced glass layer 20 and an inner lenticular lens layer 21. The lenticular lens layer 21 is composed of a diffusion material or a diffusion film having a lenticular lens function, that is, the function of the diffusion and image display. When the lenticular lens layer 21 is made of a diffusion member, the diffusion member is coated on the reinforced glass layer 20, while when the lenticular lens layer 21 is made of a diffusion film, the diffusion film is attached on the reinforced glass layer 20. The optical diffusion member 201 having the above-described structure is incorporated with the Fresnel lens 30 by a pressurized molding.

In FIG. 3B showing a side elevational view of another embodiment of the present invention, an optical diffusion member 203 is constituted by a reinforced glass layer 20 and a lenticular lens surface 23 made by etching the reinforced glass layer 20. The lenticular lens surface 23 is constituted by coating or attaching a special material or a member which can perform a holographic function differently from the FIG. 3A lenticular lens layer. Thus, the lenticular lens surface 23 has an optical characteristic of a hologram. The optical diffusion member 203 is incorporated with the Fresnel lens 30 by being pressurized and molded together with a thermosetting resin 25 sandwiched between the lenticular lens surface 23 and the Fresnel lens 30.

In FIG. 3C showing a side elevational view of still another embodiment of the present invention, a lenticular lens layer 27 is constituted by a diffusion member or a diffusion film having the lenticular lens function as described with reference to FIG. 3A, or the hologram of FIG. 3B. The lenticular lens layer 27 is coated or attached on the reinforced glass layer 20. The optical diffusion member 205 is spaced from the Fresnel lens 30 by a spacer member 41. The Fresnel lens 30 is fixed to the optical diffusion member 205 by a fixing piece 42.

Figure 4A:
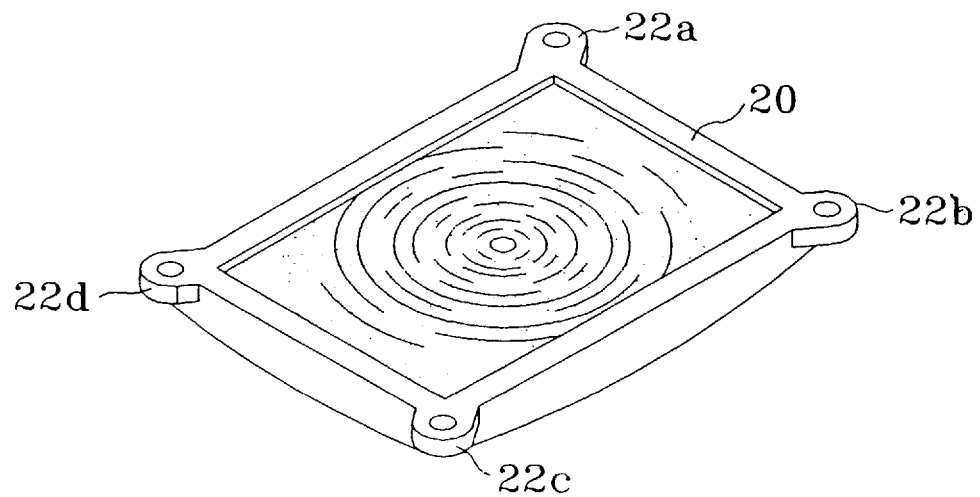
FIGS. 4A and 4B are views showing a round type and a flat type of the projection screens shown in FIGS. 3A–3C.
Figure 4B:
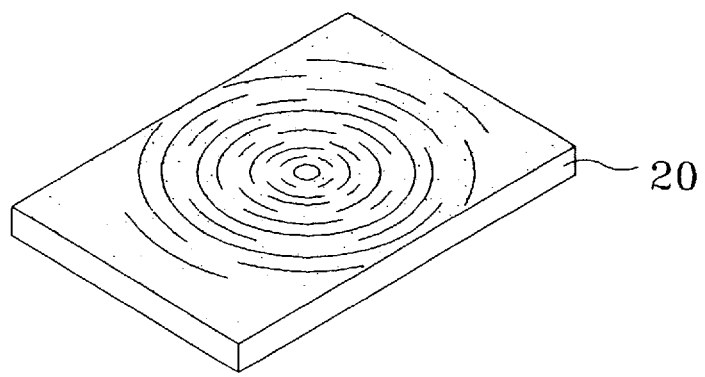

FIGS. 4A and 4B are perspective views showing the projection screens described with reference to FIGS. 3A–3C. FIG. 4A shows that the optical diffusion member 201, 203 or 205 of FIGS. 3A, 3B or 3C is fabricated into a round style as in the existing Brown tube. The optical diffusion member 201, 203 or 205 includes fixing members 22A–22D at the four corners thereof where the optical diffusion member is fixed in the front of the television set. FIG. 4B shows that the optical diffusion member 201, 203 or 205 is fabricated into a flat style.

As described above, the projection screen for a rear projection television set has an external surface made of reinforced glass, to thereby provide the same quality of picture as in a Brown tube as well as a wide angle of view. The reinforced glass is resistant to scratching or breakage to thereby enhance durability against an external circumstance. Also, the present invention is constituted by a flat style, to facilitate fabrication of a large-sized projection screen, and allows a predetermined surface curved portion in the peripheral portion as in a Brown tube to thereby take the advantage of a wide angle of view.

While only certain embodiments of the invention have been specifically described herein, it will be apparent that numerous modifications may be made thereto without departing from the spirit and scope of the invention.

What is claimed is:

1. A projection screen for a rear projection television set, said projection screen comprising:

a Fresnel lens for focusing incident image light so as to center on an optical axis of said projection screen; and an optical diffusion member including a lenticular lens portion for diffusing the image light received from said Fresnel lens, wherein an external surface of said optical diffusion member is made of glassy, wherein said glass is a reinforced glass material.

2. The projection screen according to claim 1, wherein said lenticular lens portion of said optical diffusion member is formed by etching said glass.

3. The projection screen according to claim 1, wherein said lenticular lens portion of said optical diffusion member is a material coated on a surface of said glass.

4. The projection screen according to claim 1, wherein said lenticular lens portion of said optical diffusion member is one of a microlens and a film attached on a surface of said glass.

5. The projection screen according to claim 1, wherein said Fresnel lens and said optical diffusion member are incorporated by being pressurized and molded together with a thermosetting resin sandwiched between said lenticular lens portion and said Fresnel lens.

6. A projection screen for a rear projection television set, said projection screen comprising:

a Fresnel lens for focusing incident image light so as to center on an optical axis of said projection screen; and an optical diffusion member including a lenticular lens portion for diffusing the image light received from said Fresnel lens, wherein an external surface of said optical diffusion member is made of glass, wherein said Fresnel lens and said optical diffusion member are incorporated by being pressurized and molded together with a thermosetting resin sandwiched between said lenticular lens portion and said Fresnel lens.

* * * * *